Aug. 2, 1927.

P. A. WHITE 1,637,504

VEHICLE WHEEL

Filed May 14, 1925      2 Sheets-Sheet 1

Inventor
Phillip A. White
By his Attorneys
Prindle, Bright, Neal & Dean

Aug. 2, 1927.
P. A. WHITE
1,637,504
VEHICLE WHEEL
Filed May 14, 1925   2 Sheets-Sheet 2
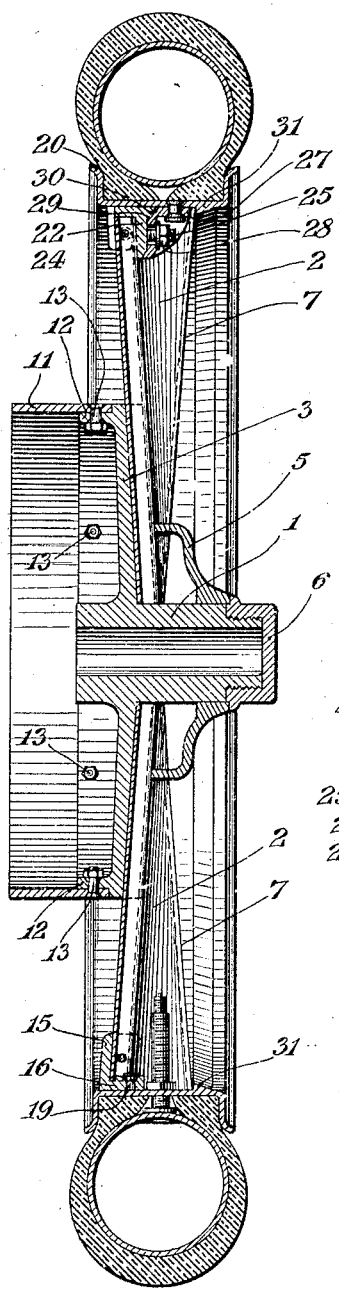
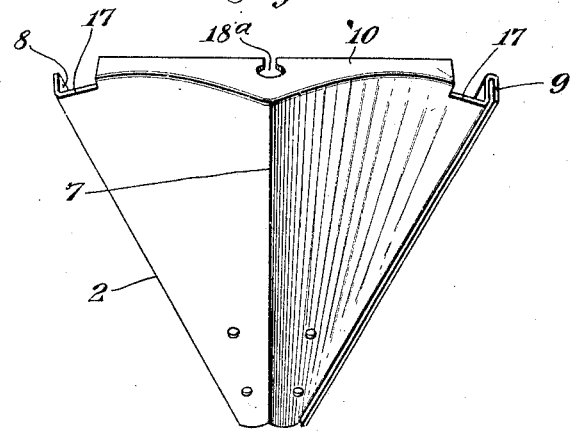
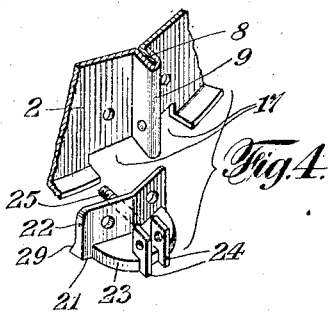
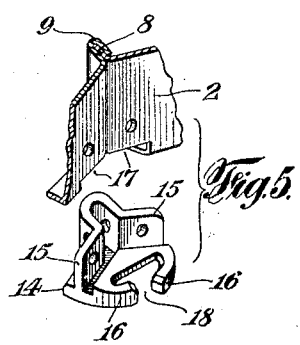
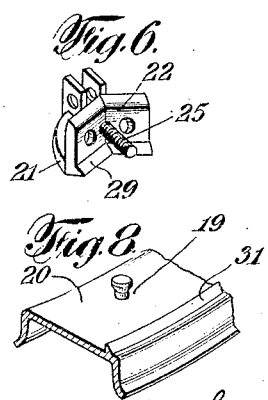
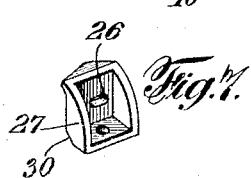
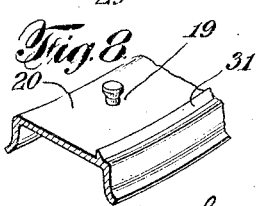
Inventor
Phillip A. White
By his Attorneys
Prindle, Bonell Neal & Bean Patented Aug. 2, 1927.

1,637,504

UNITED STATES PATENT OFFICE.

PHILLIP A. WHITE, OF ST. ALBANS, NEW YORK, ASSIGNOR, BY DIRECT AND MESNE ASSIGNMENTS, OF ONE-HALF TO ROBERT W. SIMPSON, OF NEW YORK, N. Y., AND ONE-HALF TO EVINA A. KEMP, OF NEW YORK, N. Y.

VEHICLE WHEEL.

Application filed May 14, 1925. Serial No. 30,154.

One important object of the invention is to provide a vehicle wheel of the disk type wherein the disk is made up of mating sections which may be economically formed and assembled to make up a wheel construction which will be strong and durable.

Another object of the invention is to provide a wheel structure to which a brake drum may be simply and economically attached.

The invention also aims to provide improved devices for demountably attaching the rim to the wheel proper.

Further objects and advantages of the invention will be in part obvious and in part specifically pointed out in the description hereinafter contained which taken in conjunction with the accompanying drawings, discloses a preferred embodiment thereof. Such embodiment however is to be considered merely as illustrative of the principles of the invention. In the drawings—

Fig. 2 is a central transverse section through such wheel taken on line 2—2 of Fig. 1, looking in the direction of the arrows.

Fig. 3 is a perspective view showing detached one of the sections which make up the disk of the wheel.

Figs. 4 and 5 are fragmental perspective views showing detached certain fittings which are mounted on the disk for the purpose of attaching the rim thereto.

Fig. 6 is a perspective view showing the reverse side of the fitting which appears at the bottom of Fig. 4 while Fig. 7 is a similar view of a lug which engages the part shown in Fig. 6.

Fig. 8 is a perspective view of a part of the rim.

Figure 1:
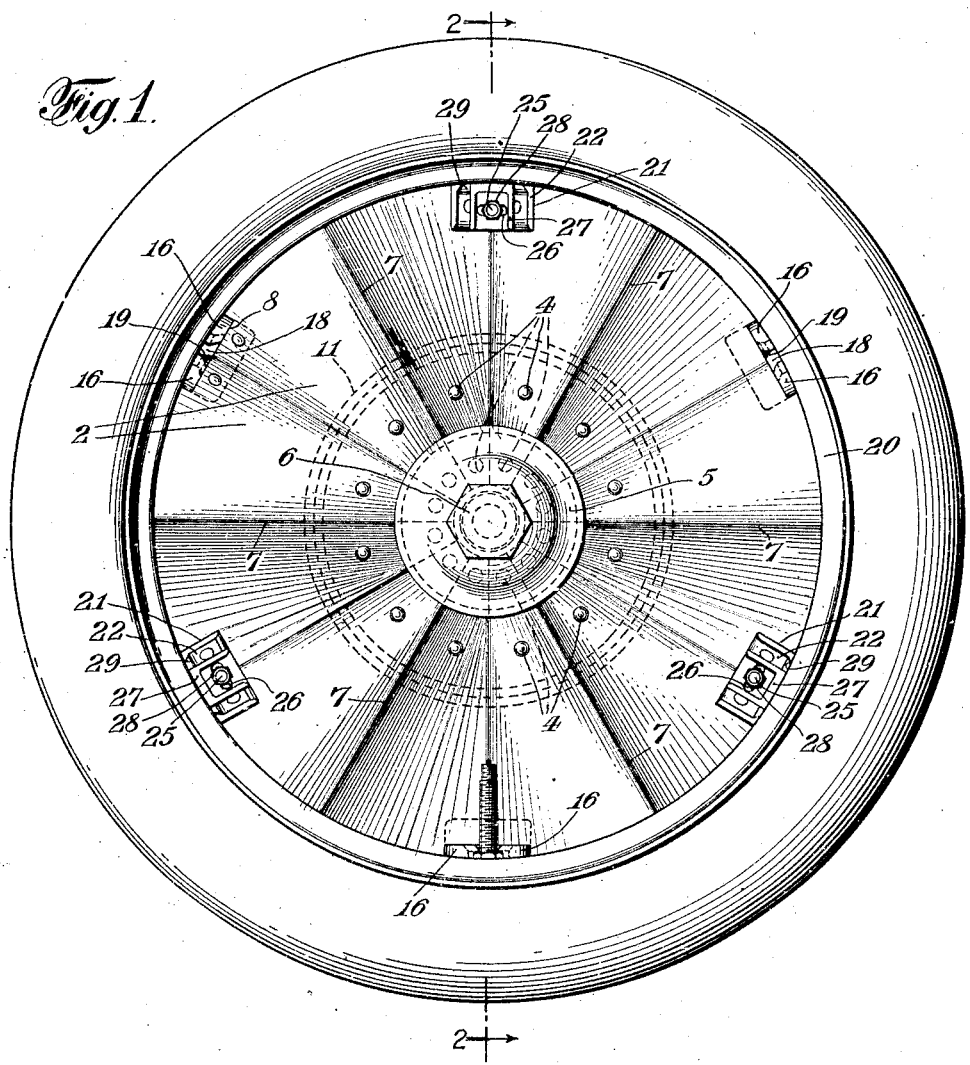
Fig. 1 is a face view of a vehicle wheel constructed in accordance with the invention.
Figure 9:
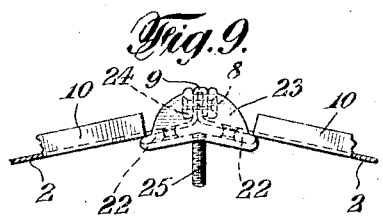
Figs. 9 and 10 are detail plan views showing the fittings which appear respectively at the bottoms of Figs. 4 and 5 mounted in operative position on the disk.

The wheel consists in general of a hub member 1 to which are secured a plurality of sector like sections 2 which are suitably secured to the hub at their inner ends. As shown the hub member is provided with a circular flange 3 upon which the inner portions of the sections lie and to which they are secured by rivets 4. A hub cap 5 may be slid over the hub 1 and clamped against the sector plates by a nut 6 shown in Fig. 2.

I prefer to bend each of the sections 2 to some extent out of the plane of the wheel as a whole in order to provide greater strength. As shown each plate is bent to form an obtuse angle with its apex 7 substantially at the central line of the plate.

I also prefer to provide interlocking parts along the side edges of adjacent plates which assist in holding the plates in proper relation to each other and also strengthen the disk to a substantial extent. As shown, one side edge of each plate is provided with a lip 8 and the other side edge is provided with a complementary U-shaped flange 9; thus in assembling the wheel successive plates are laid down around the hub member 1 with flanges 8 and 9 interlocking to make up a disk having alternate depressions and ridges on each side, the apices 7 forming the ridges on the outside of the wheel and the flanges 8 and 9 being located on the inside of the wheel. Preferably the peripheries of the plates are struck up to provide arcuate ridges 10 which when assembled form a metallic felly. The parts 2 may all be made identical in shape and dimensions, enabling each plate to be pressed out in one operation from the same pair of dies.

In accordance with another feature of the invention the brake drum is so constructed and supported from the remainder of the wheel structure as to enable an annular strap mounted upon the disk structure of the wheel to be employed as the drum. As shown, the brake drum 11 consists merely of a metal strip which is shaped into circular form and demountably fastened in place upon the disk structure; in the present form of the invention the flange 3 of the hub which in effect forms a part of the disk structure is provided with an annular shoulder 12 to which the drum 11 is suitably secured as by bolts 13. Thus replacement of the brake drum involves only the substitution of a new strip of steel corresponding to member 11, instead of the replacement of a more complicated structure such as is employed for brake drums in present day use.

In order to secure the rim demountably in place I prefer to employ certain devices which lock the rim against movement perpendicular to the plane of the wheel upon a slight angular movement of the rim relative to the wheel; and in conjunction with the above locking devices I provide further clamps which when tightened serve to impart to the rim the slight tightened motion which is necessary to lock the two plates together. Preferably, also, the above clamping and locking devices serve to reinforce the joints between adjacent plate members 2.

Figure 10:
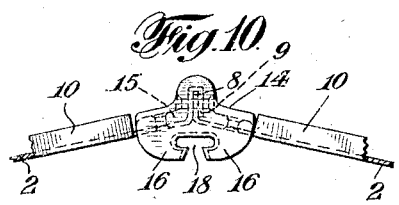

In the illustrated embodiment of the invention the locking devices and parts above mentioned are located at alternate joints between the plates 2, there being three of the locking devices and three of the clamps, as shown in Fig. 1. The locking devices consist of small fittings 14 (shown in detail in Figs. 5 and 10) having flanges 15 which embrace flanges 9 on the plates and are suitably secured thereto as by the rivets indicated in Fig. 10. The fittings have ledges 16 which are received in peripheral notches 17 (Fig. 3) of adjacent plates 2 and such ledges are provided with T-shaped slots 18 (Fig. 5) which receive headed studs 19 on the inner surface of the rim 20 when the latter is slid on to the felly of the wheel. Thus if the rim be then rotated slightly relative to the wheel, the heads of studs 19 will lock behind the walls of slots 18 to prevent movement of the rim sidewise of the wheel.

The specific type of clamping device employed is shown more in detail in Figs. 4, 6, 7 and 9. Referring to Fig. 4, for example, there is shown the angle piece 21 having a wedge shaped seat 22, which rests upon the outer surface of adjacent plates 2, and a ledge 23 which is received within the corresponding notches 17 above mentioned and has a pair of ears 24 which overlie the flange 9 corresponding thereto. The above parts may be suitably secured together by bolts or rivets which it is not deemed necessary to describe in detail.

A clamping bolt 25 projects outwardly from seat 22 and when the rim 20 is slid in place each bolt 25 will be received within an elongated slot 26 of a wedge piece 27, a corresponding number of which are secured to the inner side of the rim. In the position which the rim first assumes when studs 19 are received in slots 18, the wedge pieces 27 will not be truly alined with the wedge shaped seats 22 of angle pieces 21, but when the rim and wheel are clamped together as by tightening up the nuts 28 on bolts 25, the resultant wedging action between members 22 and 27 will cause the rim to turn slightly relative to the wheel and thus lock studs 19 in place, as well as independently clamp the rim and wheel together.

Preferably the angle pieces 21 are also provided with bevelled surfaces 29 (Fig. 6) which cooperate with the corresponding bevels 30 on wedged piece 27, to draw the rim down firmly against the felly of the wheel when the clamps are applied, and I also prefer to provide the inner surface of the rim 20 with an annular shoulder 31 (Figs. 6 and 8) which abuts against the apices 7 of plates 2 when the rim is slid into proper position over the wheel.

While a specific embodiment of the invention has been disclosed it is obvious that many changes may be made therein without departing from its principles as set forth in the following claims.

I claim:

1. A wheel of the disk type comprising a central hub, a rim and a disk, wherein the disk is provided with sector-like substantially flat portions running oblique to the plane of the wheel, each such sector-like portion standing at an angle to the adjacent portions, whereby the obtuse angles between adjacent portions form alternating V-shaped ridges and depressions radiating outwardly to the periphery of the disk and whereby the rim of the wheel is braced by adjacent portions of the disk running oblique to the plane of the wheel in zig-zag fashion.

2. A disk type wheel comprising a hub member, a plurality of sheet metal sector-like plates secured at their central portions to said hub member, said plates having complementary parts at their side edges interlocking to hold the plates together.

3. A wheel of the disk type comprising a central hub, a rim and a disk, said disk being made up of sector-like sections and each section being shaped to provide sector-like portions running oblique to the plane of the wheel, whereby the angles between said sector-portions, and the angles between adjacent sections form alternate ridges and depressions radiating outwardly in the sides of the disk, and whereby the rim of the wheel is braced by adjacent portions of the disk which run oblique to the plane of the wheel in zig-zag fashion.

4. A vehicle wheel having a disk made up of sheet metal sections having complementary parts on their side edges interlocking to hold the sections together.

5. A wheel of the disk type comprising a central hub, a rim and a disk, said disk being made up of sector-like sections and each section being shaped to provide sector-like portions running oblique to the plane of the wheel, whereby the angles between said sector portions, and the angles between adjacent sections form alternate ridges and depressions radiating outwardly in the sides of the disk, and whereby the rim of the wheel is braced by adjacent portions of the disk which run oblique to the plane of the wheel in zig-zag fashion, and means for securing adjacent sections together comprising strengthening flanges running along the side edges of the sections.

6. A disk type wheel made up of radiating sheet metal sections and means for demountably attaching a rim thereto comprising devices located at joints between the sections aforesaid and locking the corresponding sections together.

7. A disk type wheel comprising a hub member, a plurality of sheet metal sector-like plates secured at their central portions to said hub member, said plates being bent to provide a periphery for the disk of sinuous form.

8. A disk type wheel comprising a hub member, a plurality of sheet metal sector-like plates secured at their central portions to said hub member, said plates being bent to provide a periphery for the disk of sinuous form, and having peripheral flanges making up a metallic felly.

9. A vehicle wheel wherein the rim and wheel body are provided with parts interlocking, upon relative angular movement therebetween, to prevent sidewise movement of the rim relative to body of the wheel, said wheel body having one or more parts with wedge shaped seats exposed on the side of the wheel, and said rim having corresponding angle pieces adapted to engage said seats when the rim is placed over the wheel body and means for clamping together said angle pieces and wedge shaped pieces to move the rim angularly with regard to the wheel body.

10. A vehicle wheel wherein the rim and wheel body are provided with parts interlocking upon relative angular movement therebetween to prevent sidewise movement of the rim relative to the body of the wheel, and the means for clamping the rim to the wheel body adapted to move the same angularly relative to each other to lock the parts above mentioned, said clamping means having bevelled parts acting to contract the rim against the wheel body.

11. A vehicle wheel wherein the rim and wheel body are provided with parts interlocking, upon relative angular movement therebetween, to prevent sidewise movement of the rim relative to the body of the wheel, said wheel body having one or more wedged pieces with seats exposed on the side of the wheel and said rim having corresponding angle pieces adapted to engage said seats, said wedged pieces having clamping bolts projecting through said angle pieces to draw the same together.

12. A wheel of the disk type comprising a central hub, a demountable rim and a disk, wherein the disk is provided with sector-like portions running oblique to the plane of the wheel whereby the obtuse angles between adjacent portions form alternating V-shaped ridges and depressions radiating outwardly to the periphery of the disk, and one or more members carried by the periphery of the disk adapted upon relative angular movement between the rim and disk to interlock with parts on the rim to prevent sidewise movement of the rim relative to the disk.

13. A wheel of the disk type comprising a central hub, a rim and a disk, wherein the disk is provided with sector-like portions running oblique to the plane of the wheel whereby the obtuse angles between adjacent portions form alternating V-shaped ridges and depresssions radiating outwardly to the periphery of the disk, and one or more members carried by the periphery of the disk adapted upon relative angular movement between the rim and disk to interlock with parts on the rim to prevent sidewise movement of the rim relative to the disk, together with mechanism adapted to move the rim angularly with respect to the disk.

14. A wheel of the disk type comprising a central hub, a rim and a disk, said disk being made up of sector-like sections and each section being shaped to provide sector-like portions running oblique to the plane of the wheel, whereby the angles between said sector-portions, and the angles between adjacent sections form alternate ridges and depressions radiating outwardly in the sides of the disk, and a flange associated with said hub against which the inner portions of the assembled disk sections are supported.

15. A disk type wheel, comprising a disk made up of sector-like portions each of which stands at an angle to the adjacent sector-like portions and oblique to the plane of the wheel, a demountable rim mounted on the sinuous periphery of the disk, and means for releasably securing the rim in position on the periphery of the disk.

In testimony that I claim the foregoing, I have hereunto set my hand this 27th day of April, 1925.

PHILLIP A. WHITE.